(12) United States Patent
Ju et al.

(10) Patent No.: US 8,441,226 B2
(45) Date of Patent: May 14, 2013

(54) APPARATUS AND METHOD FOR ADAPTIVE ILLUMINATION CHARGING

(75) Inventors: Wan-Jae Ju, Gyeongsangbuk-do (KR); Young-Deuk Won, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 443 days.

(21) Appl. No.: 12/870,953

(22) Filed: Aug. 30, 2010

(65) Prior Publication Data

US 2011/0050160 A1 Mar. 3, 2011

(30) Foreign Application Priority Data

Aug. 28, 2009 (KR) ........................ 10-2009-0080695

(51) Int. Cl.
*H02J 7/00* (2006.01)
*H01M 10/44* (2006.01)
*H01M 10/46* (2006.01)

(52) U.S. Cl.
USPC ........................................................ 320/101

(58) Field of Classification Search .................. 320/101
See application file for complete search history.

(56) References Cited

U.S. PATENT DOCUMENTS

| | | | | |
|---|---|---|---|---|
| 6,067,062 A | * | 5/2000 | Takasu et al. | 345/87 |
| 6,094,502 A | * | 7/2000 | Hirata et al. | 382/167 |
| 6,144,366 A | * | 11/2000 | Numazaki et al. | 345/156 |
| 6,804,560 B2 | * | 10/2004 | Nisch et al. | 607/54 |
| 2002/0003218 A1 | * | 1/2002 | Yasuda | 250/584 |
| 2004/0080615 A1 | * | 4/2004 | Klein et al. | 348/143 |
| 2004/0138569 A1 | * | 7/2004 | Grunwald et al. | 600/459 |
| 2005/0117042 A1 | * | 6/2005 | Hirotsu et al. | 348/308 |
| 2006/0016963 A1 | * | 1/2006 | Maytal | 250/214 A |
| 2007/0014916 A1 | * | 1/2007 | Daniels | 427/66 |
| 2008/0030430 A1 | * | 2/2008 | Cho | 345/44 |
| 2008/0036892 A1 | * | 2/2008 | Gomi | 348/308 |
| 2009/0114830 A1 | * | 5/2009 | Rubenstein | 250/370.08 |
| 2009/0174701 A1 | * | 7/2009 | Cotter et al. | 345/419 |

FOREIGN PATENT DOCUMENTS

KR 10-2009-0051368 A 5/2009

* cited by examiner

*Primary Examiner* — Arun Williams
(74) *Attorney, Agent, or Firm* — Cha & Reiter, LLC

(57) ABSTRACT

Disclosed is an apparatus for adaptive illumination charging, including: an image process sensor for detecting an external image information; a pixel sensor unit for receiving light of the image information detected by the image process sensor, the pixel sensor unit including multiple pixels; a light quantity calculator for calculating average quantity values of light received by pixels of the pixel sensor unit within a specific area during a pre-set time period; a controller for searching for a location of a pixel corresponding to an average value with a highest light quantity average among the average quantity values of the light and notifying of the search result; and a solar battery for generating energy according to a quantity of light received by the pixel sensor unit.

9 Claims, 4 Drawing Sheets

APPARATUS AND METHOD FOR ADAPTIVE ILLUMINATION CHARGING

CLAIM OF PRIORITY

This application claims priority under 35 U.S.C. §119(a) to a Korean Patent Application entitled "Apparatus and Method for Adaptive Illumination Charging" filed in the Korean Intellectual Property Office on Aug. 28, 2009 and assigned Serial No. 10-2009-0080695, the contents of which are incorporated herein by reference.

BACKGROUND OF THE INVENTION

1. Field of the Invention

The present invention relates to an apparatus and a method for adaptive illumination charging capable of finding a location having an optimum charging efficiency through a light quantity comparison.

2. Description of the Related Art

Generally, a portable terminal refers to a wireless communication device which allows a user to roam during a call connection. Such a portable terminal initially had a limited function of providing only the voice transmission/reception, but has been evolved to provide various other functions, such as gaming, MP3 file reproduction, internet browsing, TV broadcasting, etc.

With a recent development of digital media technology, it is now possible to watch DMB (Digital Media Broadcasting) or a movie, or enjoy a high-definition game with the portable terminal.

In this respect, a large sized LCD included in the portable terminal is desired, and also the LCD allowing the user to view without inconvenience, regardless of day or night, is needed.

However, the portable terminal generally uses a battery that is detachable from one surface of the terminal. When the portable terminal has been operated for a lengthy period, power supply to the terminal can be quickly diminished. To this end, the battery can be charged again or should be replaced. A charging device typically uses a common power source, so that in order to charge the battery, the charging must be performed in a designated area that is equipped with charging capability.

In order to solve the above problems, there has been suggested a device for charging a battery using a solar battery. However, the device using the solar battery typically charges the battery using only sunlight irradiated in a fixed space and fails to address any means for optimum charging efficiency.

SUMMARY OF THE INVENTION

Accordingly, the present invention provides an apparatus and a method for adaptive illumination charging, which compares a quantity value of light extracted from image information irradiated from an outside and informs a user of a location having an optimum charging efficiency, thereby improving the battery charge efficiency.

In accordance with an aspect of the present invention, there is provided an apparatus for adaptive illumination charging, including: an image process sensor for detecting an external image information; a pixel sensor unit for receiving light of the image information detected by the image process sensor, the pixel sensor unit including multiple pixels; a light quantity calculator for calculating average quantity values of light received by pixels of the pixel sensor unit within a specific area during a pre-set time period; a controller for searching for a location of a pixel closest to an average value among the calculated average quantity values, which are obtained by the light quantity calculator, and outputting an alarming sound or a display data on a display screen according to a result of the location search; and a solar battery for generating energy according to a quantity of light received by the pixel sensor unit.

In accordance with an aspect of the present invention, there is provided a method for adaptive illumination charging, the method including: detecting an external image information by an image process sensor; receiving light of the detected image information through multiple pixels; calculating average quantity values of the light received by pixels within a specific area during a pre-set time period; searching for a location of a pixel closet to an average value among the calculated average quantity values of the light and outputting an alarming sound or a display data on a display screen according to a result of the location search; and when the display data is located in a pre-set specific area, terminating the searching of the location and charging a solar battery.

BRIEF DESCRIPTION OF THE DRAWINGS

The above and other aspects, features and advantages of the present invention will be more apparent to those skilled in the art from the following detailed description taken in conjunction with the accompanying drawings, in which.

DETAILED DESCRIPTION OF THE INVENTION

Figures 1A, 1B:
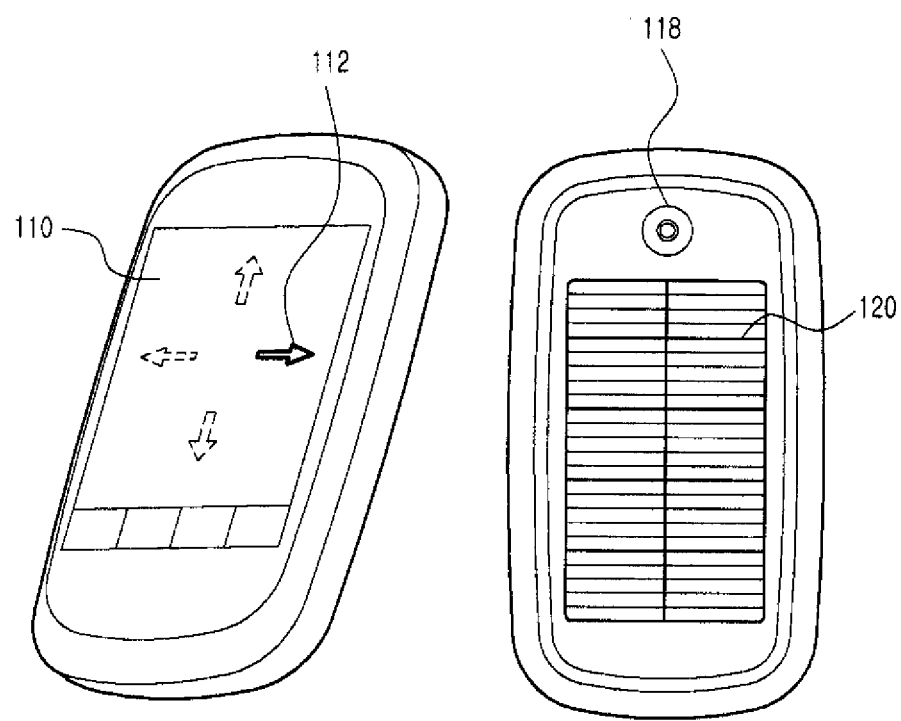
FIGS. 1A and 1B are views illustrating a front surface and a back surface of a portable terminal including an adaptive illumination apparatus according to an embodiment of the present invention.

Hereinafter, preferred embodiments of the present invention will be described with reference to the accompanying drawings. In the following description, the same elements will be designated by the same reference numerals although they are shown in different drawings. Further, various specific definitions found in the following description are provided only to help general understanding of the present invention, and it will be understood by those skilled in the art that various changes in form and details may be made therein without departing from the spirit and scope of the invention.

Although the technology proposed in the present invention is preferably applied to a portable terminal, it should be noted that the teachings of the present invention may be applied to other information and communication device and multimedia device, such as a digital broadcasting terminal, a PDA (Personal Digital Assistant), a smart phone, a 3G terminal including IMT-2000 (International Mobile Telecommunication 2000) terminal, a WCDMA (Wideband Code Division Multiple Access) terminal, a GSM/GPRS (Global System for mobile Communication Packet Radio Service) terminal, a UMTS (Universal Mobile Telecommunication Service) terminal.

FIGS. 1A and 1B are views illustrating a front surface and a back surface of a portable terminal including an adaptive illumination apparatus according to an embodiment of the present invention.

The portable terminal according the present invention includes a solar battery power unit. The solar battery may comprise a photovoltaic battery or other battery type manufactured for the purpose of converting solar energy to electric energy.

Briefly, as shown in FIG. 1A, the portable terminal displays an arrow 112 on a display screen 110, serving to indicate a direction to which the terminal should be moved. Also, the portable terminal can display the charging efficiency of the solar battery on the display screen 110. Here, the level of efficiency can be displayed using a bar type icon or a numeric expression, for example. Thus, a user can recognize a location having an optimum charging efficiency based on the indication of the charging efficiency of the solar battery and changes a location of the portable terminal, thus improving the charging efficiency of the portable terminal. A detailed explanation of providing the optimum location will be further explained with reference to FIGS. 2 and 3.

The arrow 112 displayed on the display screen 112 is displayed for the purpose of informing the user of the optimum location for optimal charging based on an analysis of light quantity irradiated on the portable terminal. Briefly, as shown in FIG. 1B, light information having various information, such as color and light quantity, of a particular outside image detected through a camera lens or an image processing sensor 118 is received by a pixel sensor unit 120. Note that each of the pixels included in the pixel sensor unit 410 is matched with each pixel of the display screen 222.

The amount of light in the area which the portable terminal is located searched. To this end, the light quantity data corresponding different areas of the display screen 112 is obtained from the pixel sensor unit 120. Then, average quantity value(s) of the light received by pixels within a specific area during a pre-set time period is calculated. Then, a location of a pixel corresponding to the optimum light quantity, for example, a location of a pixel corresponding to a quantity value which is most close to an average value with a highest light quantity average among the average quantity values is searched, and the searched location is indicated by as the arrow 112 on the display screen 110, so that the user can change the location of the portable terminal according to a direction of the arrow 112 displayed on the display screen 110.

Hereinafter, a detailed description regarding determining an optimum charging location will be explained with reference to the adaptive illumination apparatus shown in FIG. 2.

Figure 2:
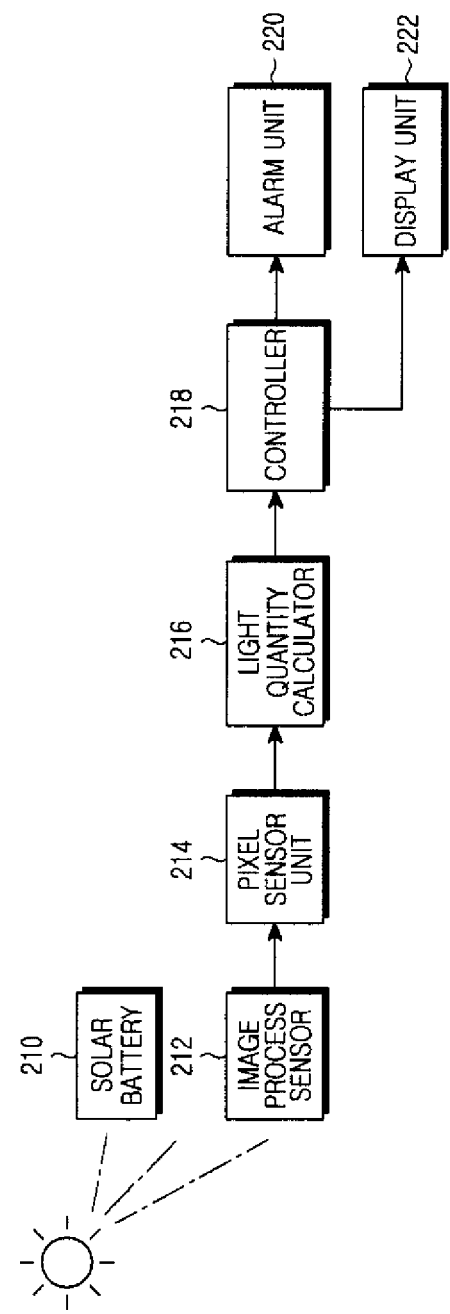
FIG. 2 is a detailed block diagram illustrating an adaptive illumination apparatus according to an embodiment of the present invention.

FIG. 2 is a detailed block diagram illustrating the adaptive illumination device according to the embodiment of the present invention.

Referring to FIG. 2, the adaptive illumination device according to the present invention includes a solar battery 210, an image process sensor 212, a pixel sensor unit 214, a light quantity calculator 216, a controller 218, an alarm unit 220, and a display unit 222.

The image process sensor 212 detects an external image information, such as color and light quantity of sunlight, etc.

The pixel sensor unit 214 includes multiple pixels and receives light information detected by the image process sensor 212.

The light quantity calculator 216 calculates an average quantity value of the light received by a pixel within a specific area among the multiple pixels of the pixel sensor unit 214 during a pre-set time period.

Figure 4:
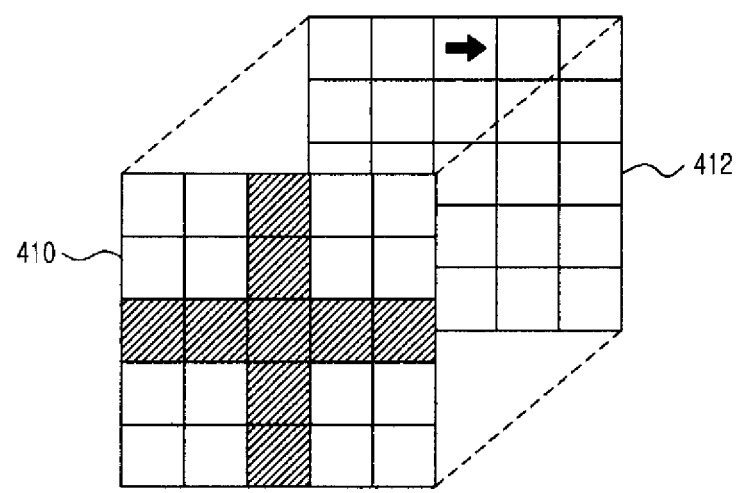
FIG. 4 is a view illustrating the matching of each pixel of an illumination sensor with each pixel of a display screen in an adaptive illumination charging apparatus according to an embodiment of the present invention.

More specifically, the light quantity calculator 216 calculates and stores the quantity value of the light received by a pixel corresponding to a specific location (i.e., shaded pixel region of FIG. 4) or area among the multiple pixels included in the pixel sensor unit 214, for example, the quantity value of the light received by a pixel (a center, top, bottom, left, or right pixel as indicated by reference number 410 of FIG. 4) detected by the image process sensor 212. Then, the light quantity calculator 216 obtains an average quantity value of the light of the corresponding pixel during a pre-set time period from the calculated and stored quantity values.

At this time, the light quantity calculator 216 obtains the quantity value of the light through applying frequency (f), which is obtained through the Fast Four Transform (FFT) of the corresponding pixel, to Equation (1).

$$E=hv \qquad (1)$$

In Equation (1), $v=(c/\lambda)=cf$, h (Planck's constant)= $6.0*10^{-34}$J*s, and c (speed of light)=$3.0*10^8$ m/s.

That is, in Equation (1), E is equal to h*C*f, and E (refers to energy of a single molecule) is proportional to frequency (f). Through the comparison of a frequency value obtained through the FFT, it is possible to compare and determine the energy quantity included in the frequency.

The controller 218 generally controls the general operation of the mobile terminal. Further, the controller 218 searches for a location of a pixel corresponding to an average value with a highest light quantity average among the average quantity values of the light, which is obtained by the light quantity calculator 216, and outputs an alarming sound or visual display on the display screen 222 according to an outcome of the location search.

That is, the controller 218 arranges the average quantity values of the light corresponding to the pixels of the specific area in descending order and searches for a location of a pixel corresponding to the largest light quantity average, i.e. the average value. At this time, the searched location refers to a direction to which the mobile terminal has to move to optimize the charging efficiency. An alarming sound is output or display data (i.e. an arrow) is output on the display screen 222, so as to enable the user to recognize the location.

Further, as shown in FIG. 4, each of the multiple pixels included in the pixel sensor unit 214 is matched or corresponds with each of pixels of the display screen 222, so that it is possible to output the display data while searching for the optimum location.

In the meantime, when the display data output on the display screen 222 is located in a pixel of a pre-set specific area among the pixels of the display screen 222, the controller 218 terminates the location search and charges the solar battery 210. Each of the multiple pixels included in the pixel sensor unit 410 is matched with each of the display screen 222, so the controller 218 can verify whether the display data output on the display screen 222 is located in a pixel of a pre-set specific area among the pixels of the display screen 222 or not. Here, the pixel within the pre-set specific area of the display screen 222 refers to, for example, a center of the display screen. The arrow of the display data directs to the center of the display screen 222 presents that the pixel corresponding to the average light quantity that is most close to the determined average light value is located on the center of the display screen 222. Therefore, the average value of the light, i.e. illumination, is irradiated to the center of the mobile terminal which is desired for optimum charging.

The solar battery 210 generates energy according to the quantity of light received by the pixel sensor unit 214, i.e. the multiple pixels. The solar battery is a semiconductor device, which directly converts light energy to electric energy using the photo voltaic effect, and is formed with a semiconductor thin films having +polarity and −polarity, respectively. When the sunlight reaches the solar battery, an electron and a hole are generated in the solar battery and charges move to the P-pole and the N-pole, respectively. Through this, potential difference between the P-pole and the N-pole is generated. At this time, when load is connected to the solar battery, the current is generated. The generated current is determined by a size of the solar battery and the intensity of light.

In general, Silicon (Si) and Gallium Arsenide (GaAs) are widely used as the solar battery, in which silicon is most widely utilized. However, Cadmium Telluride (CdTe) and Copper Indium Diselenide (CuInSe2; CIS) semiconductors, which have been recently utilized as the solar battery, may be used.

The alarm unit 220 outputs a signal for notifying an event generation of the portable terminal. That is, when the display data is output on the display screen mounted on the front surface of the mobile terminal during the charging of the solar battery through the pixel sensor unit, which receives illumination of the rear surface of the portable terminal, the alarm unit 220 notifies the user of the output of the display data using various audio sound, so as to make the user immediately recognize it.

Hereinafter, an adaptive illumination charging method according to the embodiment of the present invention will be described with reference to FIG. 3 in detail.

Figure 3:
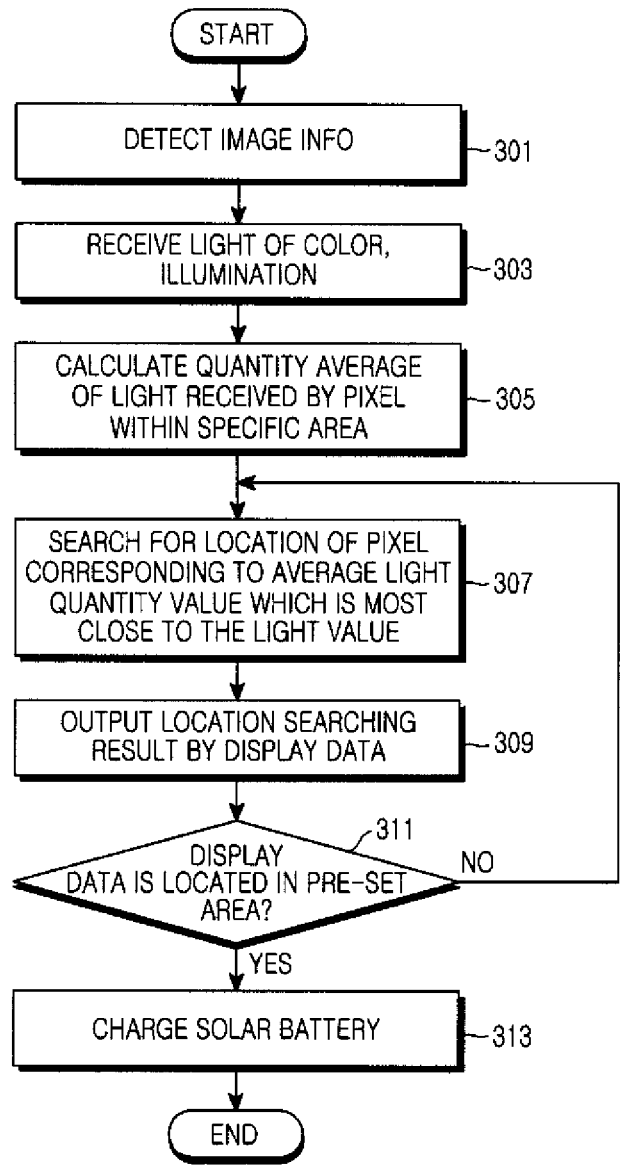
FIG. 3 is a flowchart illustrating an adaptive illumination charging method according to an embodiment of the present invention.

FIG. 3 is a flowchart illustrating the adaptive illumination charging method according to the embodiment of the present invention.

In step 301, image information, such as illumination obtained by lighting or sunlight, i.e. external illumination, is detected by using the image process sensor 212. In step 303, the illumination among the detected image information is received by the multiple pixels of the pixel sensor unit 214.

In step 305, an average quantity value of the light received by a pixel within a specific area (a center, upper, lower, left, or right pixel) among the multiple pixels of the pixel sensor unit 214 during a pre-set time period is calculated.

At this time, the light quantity is obtained by applying frequency (f), which is obtained through the Fast Four Transform (FFT) of the corresponding pixel, to above Equation 1.

In step 307, a location of a pixel corresponding to an average value that yields largest light quantity average among the average quantity values of the light is searched for. To this end, the average quantity values of the light corresponding to the pixels within the specific area are arranged in descending order, and a location of a pixel corresponding to the largest light quantity average, i.e. the average value, is searched for. At this time, the searched location refers to a direction of the location, to which the portable terminal has to move, and display data (i.e. the arrow) is output on the display screen, so as to enable the user recognize the location. In step 309, according to a result of the searching of the location, display data is output on the display screen.

Each of the multiple pixels included in the pixel sensor unit 2014 is matched with each of pixels of the display screen, so that it is possible to output the display data.

In step 311, it is checked if the display data (i.e. the arrow) output on the display screen is located in a pixel of a pre-set specific area of the display screen. In step 313, when the display data (i.e. the arrow) output on the display screen is located in the pixel of the pre-set specific area of the display screen, the solar battery is charged.

However, when the display data (i.e. the arrow) output on the display screen is not located in the pixel of the pre-set specific area of the display screen, it proceeds to step 307 and performs the processes from step 307.

The above-described methods according to the present invention can be realized in hardware or as software or as computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

According to the present invention, it is possible to compare the light quantity values of the illumination continuously irradiated in the current location and inform the user of the location having the optimum charging efficiency, thereby effectively achieving the optimum charging efficiency.

Therefore, through the aforementioned description, it is possible to implement the apparatus and the method for the adaptive illumination charging according to the embodiment of the present invention. While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. An apparatus for adaptive illumination charging, comprising:
   an image process sensor for detecting external image information;
   a pixel sensor unit having multiple pixels for receiving light of the image information detected by the image process sensor;
   a light quantity calculator for calculating average quantity values of light received by pixels of the pixel sensor unit within a specific area during a pre-set time period; and
   a controller for searching for a location of a pixel corresponding to an average value with a highest light quantity average among the average quantity values of the light and outputting an alarming sound or a display data on a display screen according to an outcome of the searched location.

2. The apparatus as claimed in claim 1, further comprising a solar battery for generating energy according to a quantity of light received by the pixel sensor unit.

3. The apparatus as claimed in claim 1, wherein when the display data is located in a pre-set specific area, the controller terminates the searching of the location and charges the solar battery.

4. The apparatus as claimed in claim 1, wherein the light quantity calculator calculates a quantity value of light through applying a frequency obtained through Fast Four Transform (FFT) of a corresponding pixel of the specific area to a following equation, $$E=h\nu,$$

wherein $v=(c/\lambda)=cf$, h (Planck's constant)$=6.0*10^{-34}$ J*s, and c (speed of light)$=3.0*10^8$ m/s.

5. The apparatus as claimed in claim 1, wherein the multiple pixels are matched with pixels of the display screen, respectively.

6. The apparatus as claimed in claim 1, wherein the illumination can be obtained by sunlight or lighting having a predetermined illumination.

7. A method for adaptive illumination charging for a terminal, the method comprising:
- detecting an external image information by an image process sensor;
- receiving light of the detected image information through multiple pixels;
- calculating average quantity values of the light received by pixels within a specific area during a pre-set time period;
- searching for a location of a pixel corresponding to an average value with a highest light quantity average among the calculated average quantity values of the light and outputting an alarming sound or a display data on a display screen to notify the search result; and
- terminating the searching of the location when the terminal is located at the searched location and charging a solar battery.

8. The method as claimed in claim 7, wherein t calculating the quantity value of the light is performed through applying a frequency obtained through Fast Four Transform (FFT) of a corresponding pixel of the specific area to a following equation, $$E = h\nu,$$

wherein $\nu = (c/\lambda) = cf$, h (Planck's constant) $= 6.0 * 10^{-34}$ J*s, and c (speed of light) $= 3.0 * 10^{8}$ m/s.

9. The method as claimed in claim 7, wherein the multiple pixels are matched with pixels of the display screen, respectively.

* * * * *